US010228528B2

(12) United States Patent
Blazer et al.

(10) Patent No.: US 10,228,528 B2
(45) Date of Patent: Mar. 12, 2019

(54) METHODS OF CONTROLLING BONDING AND ARTICLES FORMED THEREFROM

(75) Inventors: Bradley J. Blazer, Granite Falls, NC (US); Anne G. Bringuier, Taylorsville, NC (US); Michael J. Gimblet, Conover, NC (US); Cory F. Guenter, Conover, NC (US); Douglas S. Hedrick, Connelly Springs, NC (US); Jason C. Lail, Conover, NC (US); Reginald Roberts, Taylorsville, NC (US)

(73) Assignee: Corning Optical Communications LLC, Hickory, NC (US)

( * ) Notice: Subject to any disclaimer, the term of this patent is extended or adjusted under 35 U.S.C. 154(b) by 1935 days.

(21) Appl. No.: 13/130,972

(22) PCT Filed: Nov. 24, 2009

(86) PCT No.: PCT/US2009/065760
§ 371 (c)(1),
(2), (4) Date: Aug. 11, 2011

(87) PCT Pub. No.: WO2010/062906
PCT Pub. Date: Jun. 3, 2010

(65) Prior Publication Data
US 2011/0286705 A1  Nov. 24, 2011

Related U.S. Application Data

(60) Provisional application No. 61/118,196, filed on Nov. 26, 2008.

(51) Int. Cl.
*G02B 6/44* (2006.01)

(52) U.S. Cl.
CPC .......... *G02B 6/4495* (2013.01); *G02B 6/4411* (2013.01)

(58) Field of Classification Search
CPC ....................................................... G02B 6/44
See application file for complete search history.

(56) References Cited

U.S. PATENT DOCUMENTS

| 4,729,629 | A |   | 3/1988 | Saito et al. ................ 350/96.23 |
| 4,932,746 | A |   | 6/1990 | Calzolari et al. .......... 350/96.23 |
| 5,028,224 | A | * | 7/1991 | Pieper ............... A61F 13/15577 19/304 |
| 5,649,041 | A |   | 7/1997 | Clyburn, III et al. ........ 385/109 |
| 5,689,601 | A |   | 11/1997 | Hager et al. .................. 385/100 |
| 5,751,879 | A |   | 5/1998 | Graham et al. ............... 385/103 |
| 5,930,431 | A | * | 7/1999 | Lail et al. ..................... 385/100 |

(Continued)

FOREIGN PATENT DOCUMENTS

| CN | 1194038 A | 9/1998 | ............... G02B 6/44 |
| CN | 101010610 A | 8/2007 | ............... G02B 6/44 |
| EP | 527266 B1 | 2/1993 | ............... G02B 6/44 |

OTHER PUBLICATIONS

State Intellectual Property Office of the People's Republic of China Search Report, Application No. 2009801547249; 3 pages.

(Continued)

*Primary Examiner* — Sung Pak
*Assistant Examiner* — Hoang Tran
(74) *Attorney, Agent, or Firm* — William D. Doyle

(57) ABSTRACT

The bond between abutting layers is controlled by introducing particulate matter at the interface of the layers.

13 Claims, 5 Drawing Sheets

(56) References Cited

U.S. PATENT DOCUMENTS

| | | | |
|---|---|---|---|
| 6,122,424 A | 9/2000 | Bringuier | |
| 6,137,936 A | 10/2000 | Fitz et al. | 385/113 |
| 6,304,699 B2 * | 10/2001 | Field | 385/100 |
| 7,630,605 B2 | 12/2009 | Bringuier et al. | |
| 8,180,190 B2 | 5/2012 | Bringuier et al. | |
| 8,577,196 B1 | 11/2013 | McNutt | |
| 8,649,644 B2 | 2/2014 | Greenwood, III et al. | |
| 2002/0009272 A1 | 1/2002 | Parris | 385/109 |
| 2002/0097966 A1 * | 7/2002 | Zelesnik | 385/100 |
| 2004/0223707 A1 | 11/2004 | Parsons et al. | 385/100 |
| 2009/0274426 A1 | 11/2009 | Lail | |
| 2009/0317039 A1 | 12/2009 | Blazer et al. | |
| 2011/0135816 A1 | 6/2011 | Burns et al. | |

OTHER PUBLICATIONS

Patent Cooperation Treaty International Search Report and Written Opinion for International Application No. PCT/US2009/065760; dated Feb. 26, 2010—14 pages.

International Search Report and Written Opinion PCT/US2009/067658 dated Jan. 6, 2010.

Chinese First Office Action CN20090149928.3 dated Dec. 27, 2012, Chinese Patent Office.

Chinese Office Action CN200980149928.3 dated Sep. 21, 2012, Chinese Patent Office.

EP0976067.0 Search Report dated Apr. 26, 2012, 4 Pages.

* cited by examiner

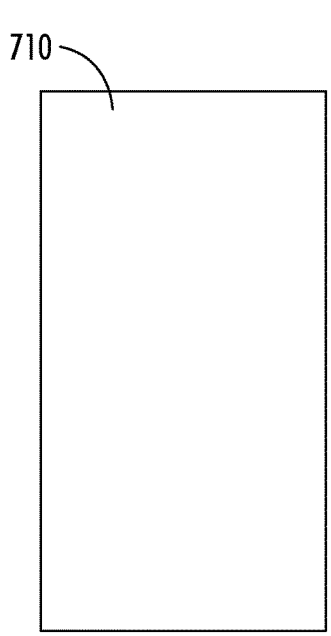 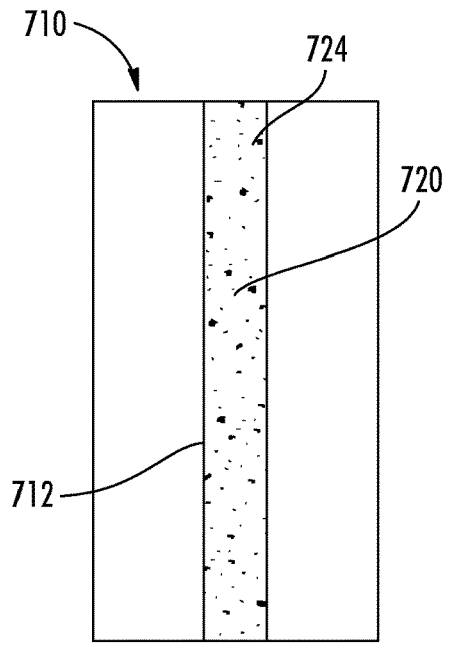
FIG. 7A    FIG. 7B
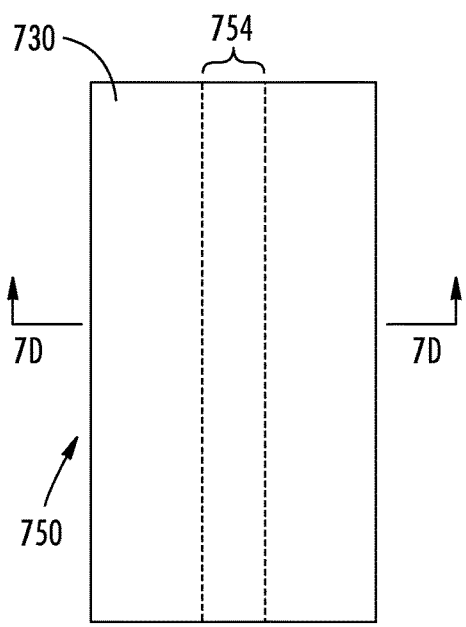 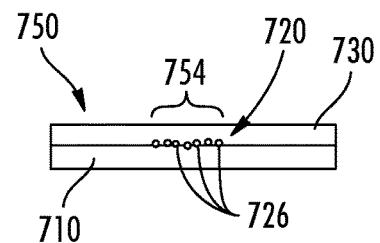
FIG. 7C    FIG. 7D

METHODS OF CONTROLLING BONDING AND ARTICLES FORMED THEREFROM

PRIORITY APPLICATION

This application is a continuation of International Application No. PCT/US09/65760 filed Nov. 24, 2009, which claims the benefit of priority to U.S. Provisional Application Ser. No. 61/118,196, filed on Nov. 26, 2008, both applications being incorporated herein by reference.

RELATED APPLICATIONS

This application is related to U.S. application Ser. No. 12/214,461, filed Jun. 19, 2008 and entitled "FIBER OPTIC CABLE HAVING ARMOR WITH EASY ACCESS FEATURES", U.S. application Ser. No. 12/150,656, filed Apr. 30, 2008 and entitled "FIBER OPTIC CABLE AND METHOD OF MANUFACTURING THE SAME", U.S. App. No. 61/121,711, filed Dec. 11, 2008 and entitled "CABLE JACKET WITH VARIABLE PERIMETER BOND", and U.S. App. No. 61/139,187, filed Dec. 19, 2008 and entitled "METHODS OF CONTROLLING BONDING AND WATER BLOCKING IN CABLES", the entire contents of these applications being hereby incorporated by reference as if presented herein.

BACKGROUND

Fiber optic cables are used to transmit data in indoor and outdoor environments. It is common for outdoor cables to include an armor for protection from rodent attack, crush, and/or for providing a generally robust cable design. The armors can be metallic, plastic, e.g. layers, and are typically covered by a cable jacket covering that is extruded over the armor.

In order to access the optical fibers within armored cables, the jacket is first stripped from the armor, and then an access point is formed in the armor, generally by breaching the armor. Conventional metallic armors typically include a coating of polyethylene or some other coating material. During manufacture of a cable, an intermediate liquid layer such as glue is applied to the armor coating before extruding the jacket over the armor. The glue is applied to form a release layer that prevents a strong thermoplastic bond from forming between the armor coating and the jacket, which could render the jacket difficult or impossible to separate from the armor.

While the intermediate glue layer allows the jacket to be separated from the armor, the bond between jacket and armor may still be relatively strong, rendering separation difficult. Glue is also relatively messy, expensive, and difficult to employ in a manufacturing environment. For example, glue must be heated to at least its melt temperature before application to the armor surface, and must be routed through sealed conduit that is close enough to the application point so that the glue does not solidify during transport. Excess glue that does not adhere to the armor surface must also be regularly cleaned from the manufacturing line.

SUMMARY

According to one embodiment, a method of making an armored fiber optic cable comprises providing a fiber optic cable core, at least partially enclosing the fiber optic cable core in armor, applying particulate matter to an exterior surface of the armor, and after applying the particulate matter, forming a covering over the armor.

According to one aspect, the particulate matter provides controlled bonding of the covering to the armor. Where the interface of the covering with the armor includes particulate matter, removal of the covering is facilitated by cohesive failure of the particulate matter when the covering is pulled from the armor. The covering can also include regions at which it is thermoplastically bonded to the armor. The combination of regions containing particulate matter (i.e., lower bonding) and regions of thermoplastic bonding can be tailored to obtain a desired removal force for the covering.

According to another aspect, specified regions of the armor can be selected for the application of particulate matter, as opposed to the entire armor surface.

According to another embodiment, a method of forming an article comprises providing a first layer, applying particulate matter to a first surface of the first layer, and after applying the particulate matter, forming a second layer over the first layer.

According to the embodiments, the particulate matter provides controlled bonding between abutting surfaces of the first and second layers.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

FIGS. 7A-7D illustrate another method of making an article with controlled bonding between surfaces of the article, wherein a targeted area of the interface of the article has controlled bonding.

DETAILED DESCRIPTION

Figure 1:
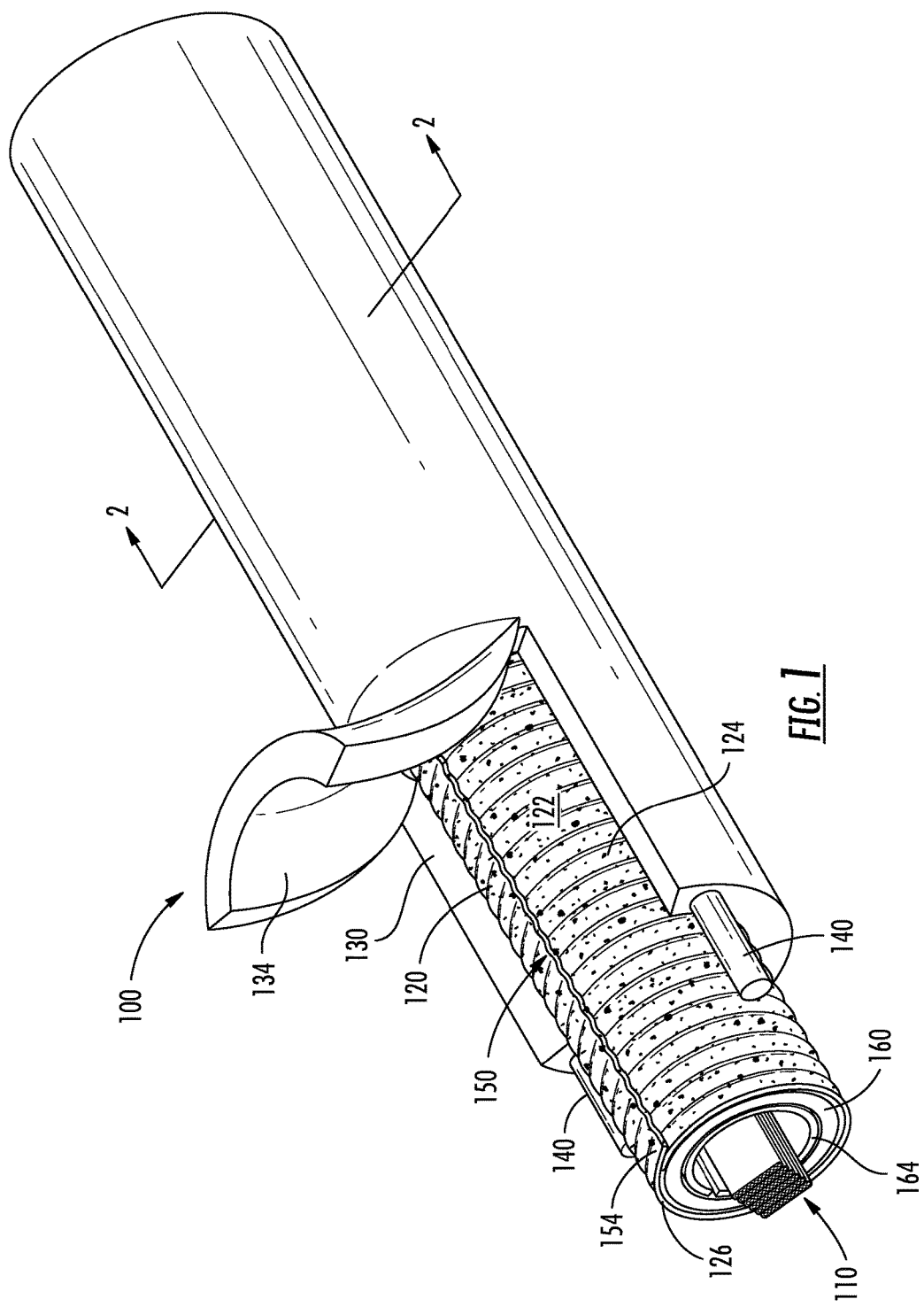
FIG. 1 is a partial cutaway view of a cable according to a first embodiment with a portion of the cable covering pulled away from the cable armor.

Reference will now be made in detail to the present embodiments, examples of which are illustrated in the accompanying drawings. Whenever possible, the same reference numerals will be used throughout the drawings to refer to the same or like parts.

Figure 2:
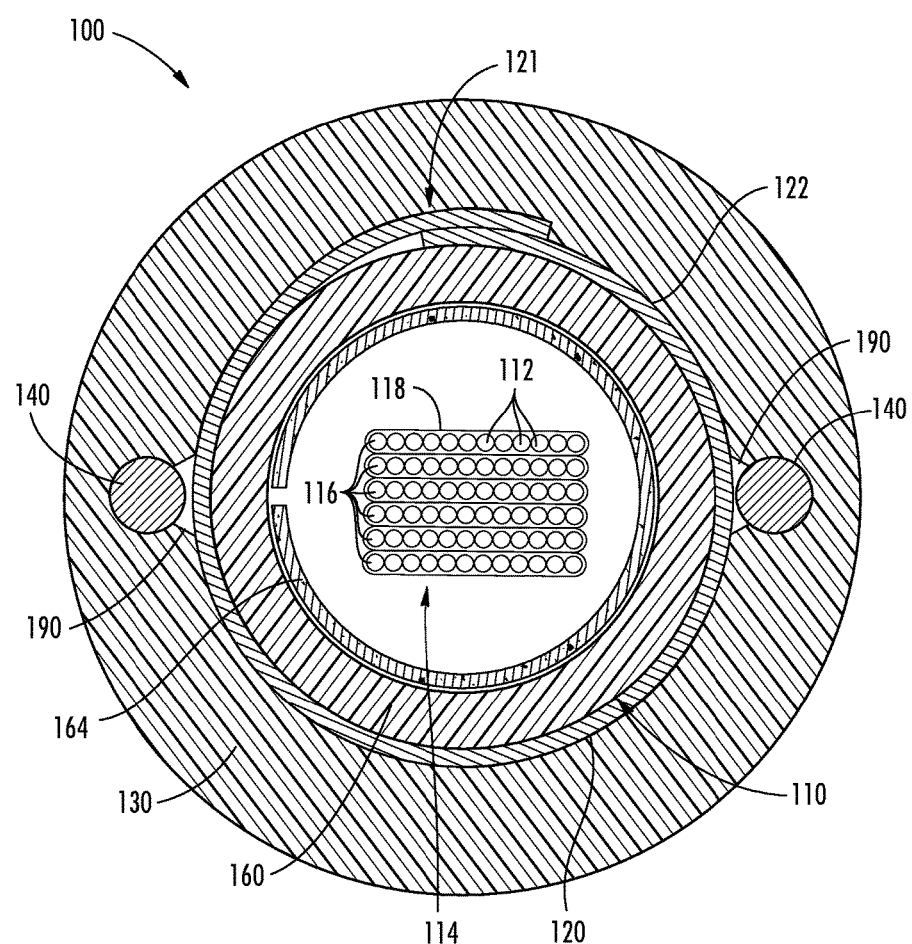
FIG. 2 is a section view of the armored cable of FIG. 1 taken along line 2-2 in FIG. 1.

FIG. 1 is a partial cutaway view of a cable 100 according to a first embodiment. FIG. 2 is a section view of the cable taken on line 2-2 in FIG. 1. The cable 100 generally comprises a core 110, armor 120 having an overlap 121 and an exterior, abutting surface 122, and a covering 130 surrounding the armor 120 and having an interior, abutting surface 134 in contact with the exterior surface 122 of the armor 120. One or more strength elements 140 can be included in the cable 100, such as a pair of elongate strength elements 140 extending along the length of the cable. The core 110 includes a polymeric buffer tube 160 and a dry insert 164 disposed within the interior of the armor 120 and extending along the length of the cable 100. A second dry insert (not illustrated) can be located between the exterior of the buffer tube 160 and the armor 120.

In the exemplary embodiment, the core 110 also includes one or more optical fibers, each optical fiber having the ability to convey fiber optic communications. The exemplary core 110 can therefore be referred to as a "fiber optic cable core". In the illustrated embodiment, the optical fibers 112 are arranged as a stack 114 of a plurality of optical fiber ribbons 116, each optical fiber ribbon 116 having a row of twelve optical fibers 112 encased in a ribbon matrix 118. Other arrangements of optical fibers are possible. The dry insert 164 can be, for example, a longitudinally extending foam tape. If desired, the buffer tube 160 and dry insert(s) can be omitted to provide ease of access to the ribbon stack 114.

The armor 120 surrounds and protects the core 110 and has a tubular shape. The interior of the armor 120 can abut an exterior surface of the core 110, or an intervening dry insert (not shown) may be present. In this specification, the term "armor" does not necessarily indicate a metallic element, and allows for the use of dielectric armors, for example. The armor 120 can include a coating 124 comprising a polymer layer formed over a base armor material 126, the coating 124 serving as the abutting surface 122 of the armor. Alternative and/or additional layers may also be included in the armor 120, so that the armor 120 is actually an armor laminate. The term "armor" is used in this specification for simplicity of description and is intended to encompass armor laminates as are generally known in the art. The structure of an exemplary armor is discussed in detail below with reference to FIG. 4.

The covering 130 surrounds and tightly abuts the armor 120 and can be referred to as a "jacket" or "cable jacket." In the exemplary embodiment, the covering 130 is a polymer material formed over the armor 120 by an extrusion process. The polymer used to form the covering 130 can be materials such as, for example, plastics. In the exemplary embodiment, the polymer covering 130 is UV-resistant medium density polyethylene (MDPE). The covering 130 can be generally described as comprising a polymer or as "polymeric", but amounts of other non-polymers can be included in the covering. In this specification, the term "polymeric" allows for the inclusion of additives, and indicates that the covering comprises at least 70% polymer material.

As shown in FIG. 2, during extrusion of the covering 130 over the armor 120, a longitudinally extending void or channel 190 may be formed between each strength element 140 and the armor 120. The longitudinally extending voids 190 are discussed in further detail below with reference to FIG. 7. In this specification, the term "void" does not mean an absence of all matter, but instead indicates a region between the strength element and armor where no polymer jacket material has infiltrated during extrusion of the covering 130.

According to one aspect of the present invention, bonding of the interior abutting surface 134 of the covering 130 to the armor 120 is controlled using a full or partial application of particulate matter 150 at the interface of the covering 130 and the armor 120. The particulate matter 150 and armor coating 124 may be relatively small and are not visible in FIG. 2. The particulate matter 150 is shown in more detail in FIG. 3 and the armor 120 is shown in more detail in FIG. 4. For the purposes of this specification, the coating 124 on the armor 120, if present, is considered to be part of the armor because suppliers often pre-coat the bulk materials used to form such armors. Polyethylene is a common coating material. If a typical plastic cable jacket material (e.g. MDPE) were extruded directly onto a polyethylene armor coating, a strong thermoplastic bond would be formed between the armor coating and the resultant plastic covering. The bond-controlling particulate matter 150 according to the present embodiments is applied at the interface of the armor 120 and the covering 130 in order to interrupt and/or weaken the thermoplastic bonding, and thereby facilitate separation of all or a part of the covering 130 from the armor 120 (shown in FIG. 1).

An adherent material layer 154 can be located at the interface of the covering 130 and the armor 120. The adherent 154 can be, for example, a layer formed from a viscous liquid applied to the armor 120 during manufacture of the cable 110. The adherent 154 helps the particulate matter 150 to adhere to the armor 120 exterior surface before the covering 130 is formed over the armor. The adherent material 154 can be a liquid, such as a liquid of medium viscosity. In the exemplary embodiment, the adherent material 154 is an oil. While the adherent material 154 is illustrated on the surface of the armor 120 in FIG. 1, materials such as oils will likely be wholly or substantially incorporated into the covering 130 during extrusion.

The particulate matter 150 can be comprised of a plurality of individual inorganic or organic particles distributed over all or a part of the surface 122 of the armor 120. The density and arrangement of the particulate matter 150 can be selected to provide a desired degree of bonding between the covering 130 and the armor 120. Suitable inorganic particulates include mineral particulates such as Talc-Hydrated Magnesium Silicate (Talc), clay (e.g., hydrated aluminum silicate), and superabsorbent polymers (SAP) such as are used in fiber optic cable water-blocking applications. An example of a suitable mineral particulate is VANTALC 2500® available from R.T. Vanderbilt Company, Inc. Another suitable particulate is a crosslinked sodium polyacrylate sold under the trade name CABLOC GR-211, available from Evonik, Inc. of Greensboro N.C. Either Talc or clay could be mixed with a small percentage of highly hydrophilic SAP particulates to provide water-blocking properties. Corrosion-resistant absorbent powders can be used as a portion of or may comprise all of the bond-controlling particulate matter. In one embodiment, a "salt water SAP" is used when the strength elements are formed from metals such as steel. Salt water SAP is less affected by ions released from rusting metals which can reduce the efficacy of standard superabsorbent polymers. Another way to prevent corrosion is the addition of anti-corrosion additive (s) in the SAP or into the adherent fluid (e.g. oil) applied during manufacturing.

According to another aspect of the invention, the interface of the covering 130 and the armor 120 can be free of materials such as glues and other materials commonly used as release layers, and the abutting surface 134 of the covering 130 directly contacts the surface 122 of the armor 120 except where the particulate matter 150 (and the thin layer of adherent material 154, if present) is interposed between the armor 120 and the covering 130. The term "abutting" as used herein, accordingly indicates adjacent surfaces of armor and covering layer, allowing for the intervening presence of particulate matter and adherent material, and where the coating 124 is considered to be a part of the armor 120. In the illustrated embodiment, the particulate matter 150 is dispersed over the entire surface area of the armor 120. In this specification, when a percentage of a surface or element is described as an application or target area of a surface for application of particulate matter, the percentage refers to a region of the armor surface over which particulate matter is applied to the surface, and not to the total surface area of the surface area actually occupied by particulate.

Figure 3:
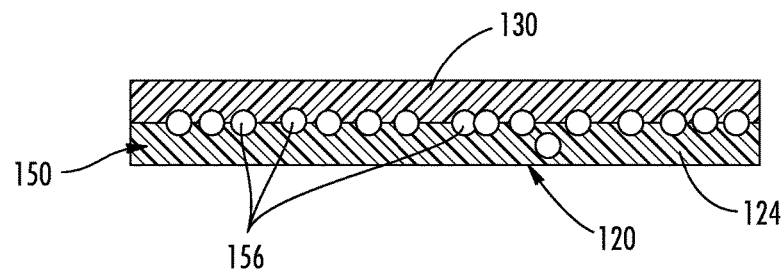
FIG. 3 is a longitudinal section view of the interface of the armor and covering of the cable of FIG. 1.

FIG. 3 schematically illustrates the controlled bonding mechanism provided by the introduction of the particulate matter 150. The section in FIG. 3 can be described as a schematic representation of a highly magnified longitudinal section of a small portion of the interface of the covering 130 and the armor 120, particularly at the coating 124 of the armor. In conventional jacket covering applications, an intermediate layer of glue or other adhesive is applied to the armor exterior before extruding a polymer jacket over the armor. In order to access the cable interior, the jacket is separated from the armor at the armor-adhesive-jacket interface, which typically has a high bonding force. According to one aspect of the present embodiment, as schematically represented in FIG. 3, the individual particles 156 of the particulate material 150 interrupt the bonding at the interface of the covering 130 with the armor 120. In FIG. 3, a section of the interface is shown as the bond of the coating 124 of the armor 120 with the covering 130. The covering 130, which is heated to a fully or partially molten state during application over the armor 120, may form a strong thermoplastic bond with the material of the armor coating 124, which can be a polymer such as polyethylene. The particulate material 150 interrupts the interlayer bond between the coating 124 and the covering 130 at a plurality of locations. Each particle 156 (which can be formed from an agglomeration of particles) therefore provides an area where the armor/covering bond can fail relatively easily during separation of the covering 130 from the armor 120. Failure at the armor/particle/covering interfacial locations can be generally referred to as "cohesive failure" because the individual particles 156 or an agglomeration of particles 156 can fail internally (i.e., the particle or agglomeration of particles breaks into separate pieces) to facilitate separation. The individual particles 156 break or undergo cohesive failure as the covering 130 is separated from the armor 120. The failure at the particulate material 150 can also be "adhesive" in that the bond of the particulate matter 150 with the covering 130 and/or with the armor 120 can be relatively low. In FIG. 3, the particles 156 are illustrated as spherical for simplicity of illustration. In practice, the particulate matter can have any shape. As shown in FIG. 3, the individual particles 156 may become at least partially embedded in the covering 130 during extrusion. The particles 156 may also become at least partially embedded in the armor coating 124.

Figure 4:
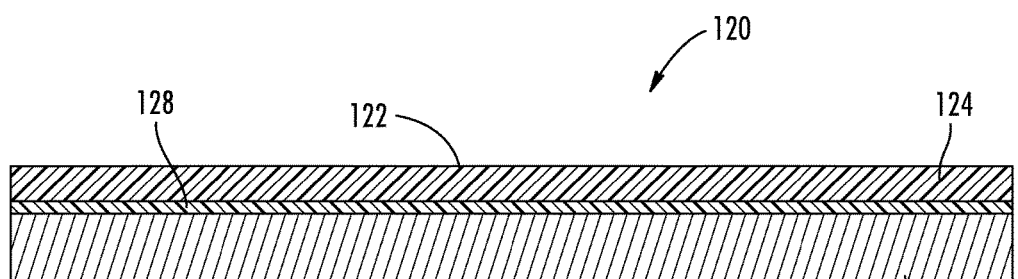
FIG. 4 is a longitudinal section view of the armor.

FIG. 4 is a partially schematic longitudinal section view of a portion of the armor 120 used in the cable of FIG. 1. The armor 120 can include a base armor material layer 126 with the coating 124 adhered to the base armor 126 by an adhesive layer 128. The adhesive layer 128 can be, for example, a film of an adhesive such as ethylene acrylic acetate (EAA). The coating 124 can include additional layers, and can, for example, be a laminate of multiple films. The base armor material layer 126 can include materials such as metals, dielectrics, etc. In the illustrated embodiments, the base armor 126 is metallic and the coating is a polyolefin.

Figure 5:
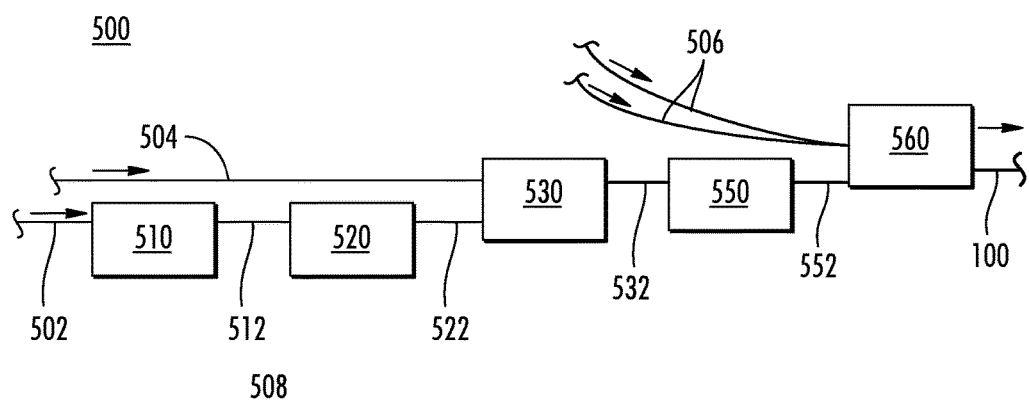
FIG. 5 is a schematic illustration of a manufacturing line suitable for forming cables with controlled bonding between surfaces in the cables.

FIG. 5 illustrates a manufacturing line 500 for forming the cable 100 having controlled bonding of the covering 130 to armor. Referring to FIG. 5, a flat sheet 502 of armor material, a core 504, and one or more strength elements 506 are continuously provided generally along the process direction 508. The flat sheet 502 can be a coated metallic, for example, and will ultimately form the cable armor 120. The sheet 502 can include a base armor material covered on one side with a polymer coating adhered by adhesive (not illustrated in FIG. 4) that forms the armor coating 124. The flat sheet 502 can be paid off from a roll, for example. The core 504 can be any longitudinally extending element that is to be enclosed within an armor and a covering. In the illustrated embodiment, the core 504 is a fiber optic cable core 110 (FIG. 2) including one or more optical fibers and paid off of a spool. In the exemplary embodiment, the strength elements 506 are elongate wire metallic elements of circular cross-section paid off of a spool.

Still referring to FIG. 5, the flat armor sheet 502 is advanced through an applicator 510 where a coating of adherent material is applied to the surface of the flat sheet 502 that becomes the abutting surface 122 (FIG. 1). The adherent can be a liquid such as an oil, and can be applied to the surface of the sheet 502 by a rotating roller that is saturated in the adherent.

The coated sheet 512 then advances into a corrugator 520 that corrugates the sheet 512. The corrugator 520 can be a conventional device for mechanically deforming the sheet 512, such as a device having two counter-rotating corrugating rollers between which the sheet 512 passes.

The corrugated sheet 522 is advanced into an armor former 530 that forms the armor sheet 512 into a general tube configuration around the core 504 so that it has the configuration shown in FIG. 1. The armor former 530 can be of a conventional configuration, and can include a die of decreasing diameter that continuously concentrically compresses and wraps the armor sheet into a tubular form about the cable core 504. The core 504 is disposed in the interior of the armor tube, with the adherent-coated surface of the armor facing outward.

If desired, the combined armor/core assembly 532 can be advanced through an adherent smoother (not illustrated) that smooths out the adherent on the exterior peripheral surface of the corrugated armor of the assembly 532. One or more high velocity gas jets, for example, can be used to spray air over the adherent to distribute the adherent over the surface of the sheet 522. Brushes may be used alternatively or in addition to gas jets.

The combined armor/core assembly 532 then advances through a particulate applicator 550. The particulate applicator 550 deposits particulate matter onto the surface of the armor tube of the armor/core assembly 532. The adherent coating on the armor of the armor/core assembly 532 helps the particulate matter to adhere to the surface of the armor/core assembly. The particulate applicator 550 can be a generally enclosed longitudinal cabinet or other structure through which the armor/core assembly 532 travels. Particulate matter can be introduced into the interior of the particulate applicator 550 by gravity, pressurized air, etc. For a general application of particulate over the entire surface of the armor, one or more air nozzles can be in communication with the applicator interior to create swirling or other flow patterns to distribute the particulate matter over the armor/core assembly 532. Alternatively, relatively small nozzles can be used to direct streams of particulate matter targeted to specific application or target areas of the surface of the armor/core assembly 532. Particulate matter can also be applied to the armor surface by passing the armor through a chamber that is in communication with a hollow cylindrical drum (not illustrated). Pressurized gas such as atmospheric air is introduced into the drum so as to create a vortex flow within the drum. An aperture is formed in the drum exterior that is in communication with a supply of particulate matter. The vortex flow creates a partial vacuum that draws in the particulate matter, with the particulate matter mixing in the vortex flow. Centripetal acceleration will cause the particulate matter to circulate at or near the outer periphery of the hollow drum, so the chamber through which the armor passes can be at the outer perimeter of the drum so that the particulate matter has a high chance of impinging on the armor and adhering thereto. In order to more effectively distribute particulate matter over the armor, drums can be arranged sequentially along the manufacturing line so that each drum can direct particulate matter towards a particular section (or arc section) of the armor perimeter. For example, four drums can be arranged sequentially on the manufacturing line, the drums being arranged at 0, 90, 180 and 270 degrees about the armor for targeting separate quadrants of the armor exterior.

The armor/core assembly 552 with applied particulate matter is then advanced to an extrusion apparatus 560. The extrusion apparatus 560 works according to conventional principles, in which the armor/core assembly 552 is advanced through an extrusion die where extrudate is introduced around the assembly 552. The molten extrudate forms an extrusion cone around the assembly 552 that eventually shrinks radially or draws down and tightly forms onto the exterior surface of the armor of the assembly 552. The extrudate forms the tubular covering 130 illustrated in FIG. 1. The molten polymer from the extrusion process provides the heat energy for thermoplastic bonding between the armor coating and the covering 130. The assembly can then be advanced through a cooling device such as a trough, the cooled assembly now constituting the cable 100 (FIG. 1). The cable 100 can then be collected on a take-up device, such as, for example, a take-reel or take-up disc.

As shown in FIG. 5, strength elements 506 can be introduced to the extrusion die of the extrusion apparatus 560. The strength elements 506 can become wholly or partially encased in the covering 130, as shown in FIG. 1. The strength elements 506 can be aligned so that they are closely adjacent to or abut the exterior surface of the armor/core assembly at one or more locations. As discussed in further detail below, the extrusion process may be such that voids or channels may be left between the strength elements and the armor. The strength elements 506 can be maintained relatively close to the armor during extrusion so that material extruded to form the covering 130 does not infiltrate into the spaces between the strength elements and the armor, which can render removal of the covering 130 difficult. Upstream of the extrusion tooling, the strength elements can be spaced from the armor. Without being bound by theory, Applicants believe that excessive impacts of the strength elements with the armor during processing may cause the overlap point 121 to rotate (e.g., rotate so as to deviate from a nominal clock location in FIG. 2) excessively during manufacture.

Referring back to FIG. 2, particulate matter 150 on the surface 122 of the armor 120 near the strength elements 140 can serve to inhibit and/or prevent the migration of water along the voids 190. If, for example, the particulate matter 150 includes superabsorbent polymer, a mix of such polymers, or a mixture containing such polymers, the absorbent particulate matter will absorb water migrating along the void and block the migration. An example of a particulate mixture suitable for blocking water migration is Talc or clay mixed with SAP particles. SAP alone used as the particulate matter 150 will also block water migration along the voids 190.

The flow rate of particulate matter to the particulate applicator 550, and accordingly the total amount of particulate matter incorporated into the cable, can be varied in order to obtain a desired bond strength at the interface of the covering 130 and the armor 120. In general, the total amount of particulate matter incorporated in a cable will be at least 25 milligrams per meter in cables having diameters in the range of 5 mm to 35 mm. Higher amounts, such as at least 500 mg/m, or even over 2000 mg/m of cable can be used in cables having diameters in the range of 5 mm to 35 mm. For cables having a diameter of 10 mm or more, amounts over 100 mg/m, or over 1000 mg/m or over 2000 mg/m can be used.

Example 1

A fiber optic cable 100 as illustrated in FIG. 1 has an MDPE plastic covering 130 extruded over an armor 120 or metallic base material 126 and having an ethylene (e.g., polyethylene) coating 124. The particulate matter 150 is a mineral particulate and is applied generally over an application target area that is essentially all of the armor exterior surface. The particulate does not cover all of the surface area, and occupies about half of the area of interface of the ethylene armor coating 124 and the MDPE covering 130. For a 100 mm$^2$ area of interface between the armor coating 124 and the covering 130, 50 mm$^2$ of the interface area has an interlayer failure mechanism (i.e., thermoplastic bonding of covering 130 to armor coating 124) with a relatively high bonding force of 2.0 N/mm$^2$. For the other 50 mm$^2$ of the interface area, the presence of particulate matter 150 at the interface creates regions of cohesive bonding within the compacted particulates having a relatively low bonding force of 1.0 N/mm$^2$. For this estimated example, the average bonding force for the 100 mm$^2$ area of interface is 1.5 N/mm$^2$. The strength elements 140 are formed of steel metallic wire rolled off of a spool. The strength elements 140 extend along the length of the cable 100 and at least intermittently contact the surface of the corrugated armor 120.

Example 2

A fiber optic cable 100 as illustrated in FIG. 1 has an MDPE covering 130 extruded over a metallic armor 120 having an ethylene (e.g., polyethylene) coating 124. The application target area of the particulate matter 150 is essentially all of the exterior surface of the armor. The particulate matter 150 is a mineral and is applied so that it occupies substantially all of the area of interface between the ethylene armor coating 124 and the MDPE covering 130. In the interface area, the presence of particulate matter 150 creates an area of cohesive bonding within the compacted particulate having a relatively low average bonding force of 1.0 N/mm$^2$. The strength elements 140 are formed of steel metallic wire rolled off of a spool. The strength elements 140 extend along the length of the cable 100 and at least intermittently contact the surface of the corrugated armor 120.

Example 3

A fiber optic cable 100 as illustrated in FIG. 1 has an MDPE plastic covering 130 extruded over an armor 120 of steel base material 126 and having a polyolefin film coating 124. The particulate matter 150 is VANTALC 2500 available from R.T. Vanderbilt Company, Inc. The outside diameter of the cable 100 is about 15 mm and the thickness of the coating 124 is in the range of 0.045-0.070 mm. The armor 120 is a single laminate coated steel tape. The thickness of the steel base material 126 is in the range of about 0.14-0.17 mm. During processing, the armor material is coated with oil, which is smoothed before forming. The particulate matter is applied by four sequentially-arranged vortex flow drums arranged at 0, 90, 180 and 270 degrees about the cable during processing. The strength elements 140 are formed of steel metallic wire of 1.5 mm diameter rolled off of a spool. The strength elements 140 extend along the length of the cable 100 and at least intermittently contact the surface of the corrugated armor 120. The core 110 includes a dry insert 164, a buffer tube 160, and a ribbon stack 114 of a plurality of twelve-fiber ribbons.

According to the present embodiments, the bond between abutting layers or elements can be controlled by a relatively simple application of particulate matter between the layers. The use of glues and other adhesives can be avoided, rendering the cable manufacturing process cheaper and less difficult to practice. The particulate matter can be delivered by a pneumatic delivery system, which is cheaper than the heated pump conveyance systems required for glues and other adhesives. Further, the bonding force can be relatively easily controlled by varying the amount of particulate matter introduced into the particulate applicator 550, the air flow volumes, patterns and velocities used to mix the particulate matter, the particle size and composition, and other easily managed variables. Also, there is a large selection of particulate matter available at relatively low prices. The particulate matter can also be selected to have water-swellable and anti-corrosive properties.

Particulates may also be applied to the armor using an electrostatic applicator. For example, the armor can be maintained at a positive charge, and the particulate matter can be oppositely charged and applied to the surface of the armor. This method obviates the need for an adherent.

Particulate matter can also be applied to the surface of the armor by passing the armor through a fluidized bed of particulate matter.

In this specification, the term "particulate matter" is understood to include mixtures of solid particulates of differing type and/or particle size as well as single composition and size particulates. An individual "particle" may be formed of a group of two or more agglomerated particles.

The optical fibers employed in the present embodiments may be any suitable type of optical waveguide. Moreover, the optical fibers may be a portion of a fiber optic ribbon, a bundle of optical fibers, or the like. Fibers such as those available under the ClearCurve™ brand name from Corning Incorporated may be used in the present embodiments.

Alternative types of suitable particulates include cross-linked sodium polyacrylate available from Absorbent Technologies, Inc. under the tradename AQUAKEEP J550P, copolymers of acrylate and polyacrylamide, graphite, boron, calcium carbonate powder, and flame retardant powders such as aluminum trihydroxide (ATH), and/or the like.

The covering 130 can be made from extrudable polymer materials such as, for example, MDPE, UV-stabilized polyethylenes, etc.

The strength elements 140 in the illustrated embodiments are metallic. Other materials, including dielectrics such as glass-reinforced plastic (GRP) can also be used to form strength elements in accordance with the present embodiments.

The core 110 can be fiber optic core types such as stranded tube cables, monotube cables, micromodule cables, slotted core cables, loose fibers, tube assemblies, loose and stranded tube, tight-buffered fiber, single tube drop cables or the like. Additionally, the cable cores can include any suitable components such as water-blocking or water-swelling components, flame-retardant components such as tapes, coatings, or other suitable components. Fiber optic cable cores may have any suitable fiber count such as a 6-fiber MIC cable or 24-fiber MIC cable available from Corning Cable Systems of Hickory, N.C. Suitable specific fiber optic core cable types include cables sold under the ALTOS® trademark, SST-RIBBON™, and SST-UltraRibbon™ cables available from Corning Cable Systems.

FIGS. 6A-6D illustrate a method of making an article with controlled bonding between article layers according to the present embodiments.

Figure 6A:
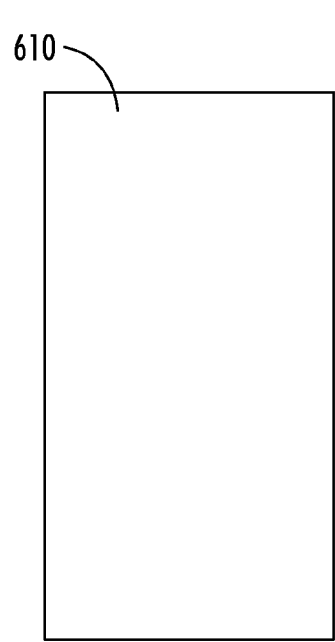
FIGS. 6A-6D illustrate a method of making an article with controlled bonding between surfaces of the article.
Figure 6B:
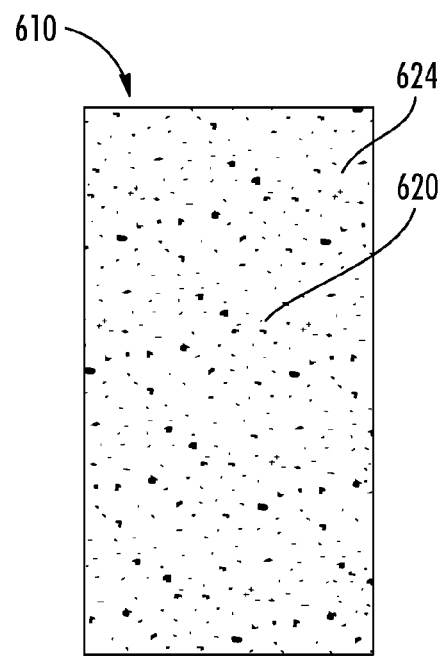
Figure 6C:
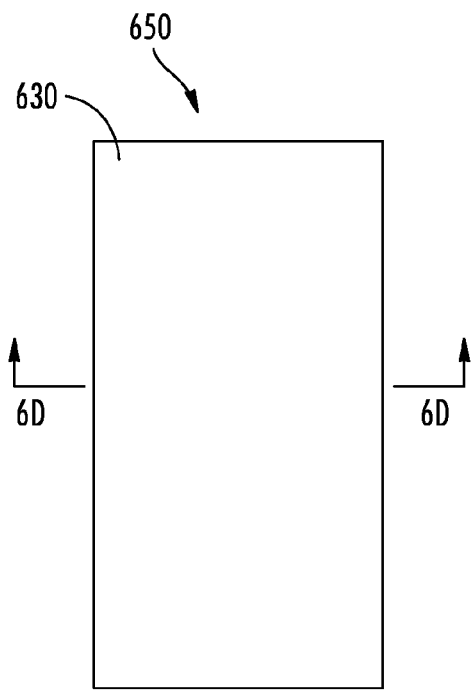
Figure 6D:
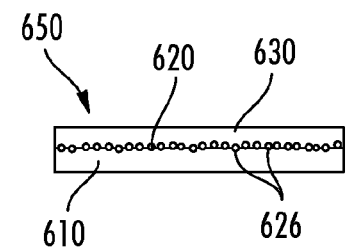

Referring to FIG. 6A, a first layer 610 is provided. Referring to FIG. 6B, particulate matter 620 is applied over an application target area comprising the entire surface of the first layer 610. A coating of adherent 624 can be applied to the first layer 610 before applying the particulate matter 620 to ensure the particulate matter remains in place on the first layer. Referring to FIG. 6C, a second layer 630 is formed over the first layer 610 with the particulate matter 620 being disposed at the interface of the first and second layers 610, 630. The layers of the resultant article 650 are shown in FIG. 6D, which is a section view taken on line 6D-6D in FIG. 6C. As shown in FIG. 6D, the individual particulates 626 of the particulate matter 620 interrupt portions of the interface of the first layer 610 with the second layer 630. The first and second layers 610, 630 can be materials subject to tight interlayer bonding when heated for example. In such cases, the internal cohesive bonding forces within the individual particulates 624 can be lower, per unit of interface area, than the interlayer bonding between the first and second layers 610, 630 at the interface. The particulates 624 therefore provide regions of potential cohesive failure between the layers 610, 630 to facilitate separation of the layers. In the exemplary method of FIGS. 6A-6D, the first layer 610 and the second layer 630 are polymeric, and the particulate matter comprises a mineral compound. The second layer 630 is applied to the first layer 610 while in an at least partially molten or liquid state.

In this specification, when a percentage of an application or target area of a surface (such as a flat surface or the exterior of tubular armor) is described as covered by particulate matter, the percentage refers to the application area (i.e., a region of the armor surface) over which particulate matter is applied to the surface, and not to the total surface area of the surface area actually occupied by particulate. For example, in FIG. 6B, the target or application area for particulate matter is the entire surface of the first layer, while the particulate matter does not actually cover 100% of the first layer. FIGS. 7A-7D illustrate another method of controlling bonding between layers according to the present invention in which the target application area is less than the entire interface area between article layers.

Referring to FIG. 7A, a first layer 710 is provided. Referring to FIG. 7B, particulate matter 720 is applied over a targeted application area 712 (in the form of a strip in FIG. 7B) of the surface of the first layer 710. The targeted application area can occupy, for example, less than three quarters of the surface area of the first layer 710, or, in an alternative embodiment, less than half of the surface area of the first layer 710. In the illustrated embodiment, the particulate matter 720 is applied over a target area 712 occupying less than 25% of the total surface area of the first layer 710. A coating of adherent 724 can be applied to the first layer 710 before applying the particulate matter 720 to ensure the particulate matter remains in place on the first layer 710.

Referring to FIG. 7C, a second layer 730 is formed over the first layer 710 with the particulate matter 720 being disposed at a portion of the interface of the first and second layers 710, 730. The layers of the resultant article 750 are shown in FIG. 7D, which is a section view taken on line 7D-7D in FIG. 7C. As shown in FIG. 7D, the individual particulates 726 of the particulate matter 720 interrupt the interface of the first layer 710 with the second layer 730 in the area 754 of the article 750. The first and second layers 710, 730 can be materials subject to tight interlayer bonding when heated. In such cases, the internal cohesive bonding forces within the individual particulates 726 can be lower, per unit of interface area, than the interlayer bonding between the first and second layers 710, 730 at the interface. The particulates 726 therefore facilitate separation of the layers 710, 730 at the location 754. The remaining area of interface between the layers 710, 730 can be bonded by interlayer bonding, such as through thermoplastic bonding. In the exemplary method of FIGS. 7A-7D, the first layer 710 and the second layer 730 are polymeric, and the particulate matter comprises a mineral compound. The second layer 730 is applied to the first layer 710 while in an at least partially molten or liquid state.

Many modifications and other embodiments of the present invention, within the scope of the claims will be apparent to those skilled in the art. For instance, the concepts of the present invention can be used with any suitable fiber optic cable design and/or method of manufacture. For instance, the embodiments shown can include other suitable cable components such as an armor layer, coupling elements, different cross-sectional shapes, or the like. Thus, it is intended that this invention covers these modifications and embodiments as well those also apparent to those skilled in the art.

What is claimed is:

1. A method of making an armored fiber optic cable comprising:
   providing a fiber optic cable core, the fiber optic cable core including at least one optical fiber capable of conveying optical signals;
   at least partially enclosing the fiber optic cable core in armor;
   applying particulate matter to an exterior surface of the armor; and
   after applying the particulate matter, forming a covering over the armor; wherein forming a covering over the armor comprises extruding a polymer covering over the armor; wherein the covering surrounds the armor in the circumferential direction, wherein the particulate matter becomes at least partially embedded in the covering during forming of the covering over the armor.

2. The method of claim 1, wherein applying particulate matter comprises blowing particulate matter over an exterior surface of the armor.

3. The method of claim 2, wherein at least partially enclosing the fiber optic cable core in armor comprises deforming an armor sheet around the fiber optic cable core, wherein deforming the armor sheet occurs before the applying of the particulate matter.

4. The method of claim 3, wherein the covering is generally tubular and wherein the armor is generally tubular.

5. The method of claim 2, further comprising applying adherent over the armor so that the particulate matter adheres to the adherent.

6. The method of claim 2, wherein providing a fiber optic cable core comprises providing an elongate fiber optic cable core moving along a process direction.

7. A method of making an armored fiber optic cable comprising:
   providing a fiber optic cable core, the fiber optic cable core including at least one optical fiber capable of conveying optical signals;
   at least partially enclosing the fiber optic cable core in armor;
   applying particulate matter to an exterior surface of the armor; and
   after applying the particulate matter, forming a covering over the armor; wherein the particulate matter comprises a plurality of individual particles, wherein applying particulate matter comprises blowing the plurality of individual particles over an exterior surface of the armor.

8. The method of claim 7, further comprising applying adherent over the armor so that the particulate matter adheres to the adherent.

9. A method of making an armored fiber optic cable comprising:
   providing a fiber optic cable core, the fiber optic cable core including at least one optical fiber capable of conveying optical signals;
   at least partially enclosing the fiber optic cable core in armor;
   applying particulate matter to an exterior surface of the armor; and
   after applying the particulate matter, forming a covering over the armor; wherein the particulate matter becomes at least partially embedded in the covering during forming of the covering over the armor.

10. A method of making an armored fiber optic cable comprising:
    providing a fiber optic cable core, the fiber optic cable core including at least one optical fiber capable of conveying optical signals;
    at least partially enclosing the fiber optic cable core in armor;
    applying particulate matter to an exterior surface of the armor; and
    after applying the particulate matter, forming a covering over the armor; wherein: forming a covering over the armor comprises extruding a polymer covering over the armor; applying particulate matter comprises blowing particulate matter over an exterior surface of the armor; at least partially enclosing the fiber optic cable core in armor comprises deforming an armor sheet around the fiber optic cable core; providing a fiber optic cable core comprises providing an elongate fiber optic cable core moving along a process direction; the particulate matter becomes at least partially embedded in the covering; and the armor is generally tubular.

11. The method of claim 10, further comprising applying adherent over the armor so that the particulate matter adheres to the adherent.

12. The method of claim 11, wherein:
    the armor comprises a first armor material and a coating over the first armor material;
    the covering is generally tubular; and portions of the armor become thermoplastically bonded to the covering during forming of the covering over the armor.

13. A method of making an armored fiber optic cable comprising: providing a fiber optic cable core, the fiber optic cable core including at least one optical fiber capable of conveying optical signals; at least partially enclosing the fiber optic cable core in armor by deforming an armor sheet around the fiber optic cable core; blowing a plurality of individual particles on to an exterior surface of the armor after deforming of the armor sheet; and after applying the plurality of individual particles, forming a covering over the armor.

\* \* \* \* \*